United States Patent [19]

Tobey

[11] Patent Number: 4,953,292

[45] Date of Patent: Sep. 4, 1990

[54] HAND-HOLDABLE TUBE CUTTING DEVICE

[76] Inventor: Billy D. Tobey, 23736 E. Virgin St., Catoosa, Okla. 74015

[21] Appl. No.: 412,340

[22] Filed: Sep. 26, 1989

[51] Int. Cl.⁵ .............................................. B23D 21/08
[52] U.S. Cl. ......................................... 30/97; 30/101; 30/123.3
[58] Field of Search .................... 30/96, 97, 101, 90.3, 30/95, 123.3; 82/128; 51/5 B

[56] References Cited

U.S. PATENT DOCUMENTS

| 2,747,274 | 5/1956 | Willard et al. | 30/97 |
| 2,769,235 | 11/1956 | Martois | 30/97 |
| 4,402,136 | 9/1983 | Rast | 30/101 |
| 4,418,591 | 12/1983 | Astle | 30/97 X |
| 4,492,136 | 1/1985 | Walker | 30/101 X |
| 4,769,911 | 9/1988 | Araki | 30/94 |

Primary Examiner—Douglas D. Watts
Attorney, Agent, or Firm—T. M. Gernstein

[57] ABSTRACT

A hand-holdable tube cutting device includes a tube clamping unit that opens and closes to hold a tube being cut in position. The clamping unit includes a driven bevel gear that moves in a race. The bevel gear is driven by a driver bevel gear that is connected to a motor. A sanding unit is mounted on the driven bevel gear and a cutting oil dispensing system is included. The entire device can be operated using one hand via a trigger mechanism whereby a plurality of functions can be effected.

9 Claims, 5 Drawing Sheets

HAND-HOLDABLE TUBE CUTTING DEVICE

TECHNICAL FIELD OF THE INVENTION

The present invention relates to the general art of hand tools, and to the particular field of the tube cutters.

BACKGROUND OF THE INVENTION

Many plumbing jobs require a tube to be cut for sizing, splicing or the like. Tube cutting can be quite difficult and awkward, especially if the cutting must be performed in situ, and the location of the operation is quite confined. Often, the person making the cut must hold some othe item, such as an element covering the tube being cut, or the like while the cutting operation is being carried out. I such an instance, the cutting operation may require two people, which can be wasteful.

Still further, many tube cutting operations require the cut tube to be sanded and to have cutting oil applied thereto during the cutting operation. These requirements further exacerbate the above-discussed problems.

While the art has many tube cutters, and even has several examples of hand-held tube cutters, none of the devices presently known in the art is capable of performing a plurality of different operations while being held in a user's hand, and while further permitting the user to have his other hand free.

Therefore, there is a need for a tube cutting device which can be operated by a single user with one hand and which can also perform several operations associated with a tube cutting operation, including sanding and applying cutting oil to the tube during such cutting operation.

OBJECTS OF THE INVENTION

It is a main object of the present invention to provide a tube cutting device which can be operated by a single user with one hand.

It is another object of the present invention to provide a tube cutting device which can be operated by a single user with one hand and which can also perform several operations associated with a tube cutting operation.

It is another object of the present invention to provide a tube cutting device which can be operated by a single user with one hand and which can also perform several operations associated with a tube cutting operation including sanding and applying cutting oil to the tube during such cutting operation.

SUMMARY OF THE INVENTION

These, and other, objects are achieved by a hand holdable tube cutting device which includes a tube clamping unit that securely holds a tube being cut. The tube clamping unit includes a bipartite driven bevel gear which is openable and closable and which engages with a driver bevel gear when closed. A tube cutter unit is mounted on the driven bevel gear for movement therewith around the tube and is biased into contact with that. A sanding unit is also mounted on the driven bevel gear and a cutting oil dispensing system is included with a dispensing nozzle located adjacent to the tube center.

The clamping unit is hinged to a housing to open to receive a tube to be cut and to close about that tube to hold it in cutting positon. The driver bevel gear is connected to a motor. The device also includes a handle havin an on/off switch and a clamping unit operating shaft thereon.

In this manner, a single user can securely hold a tube during a cutting operation while controlling that operation. The same single user can also effect and control several operations associated with the tube cutting operation, including sanding the cut tube and applying cutting oil during the cutting operation.

The device can also be used without the oiling system in applications, such as use by an electrician or the like, and will include a vise grip assembly so the element being cut can be securely held.

A lock assembly is also included in the device so that the clamp can be closed and will securely hold to workpiece.

DETAILED DESCRIPTION OF THE PREFERRED EMBODIMENT OF THE INVENTION

Figure 1:
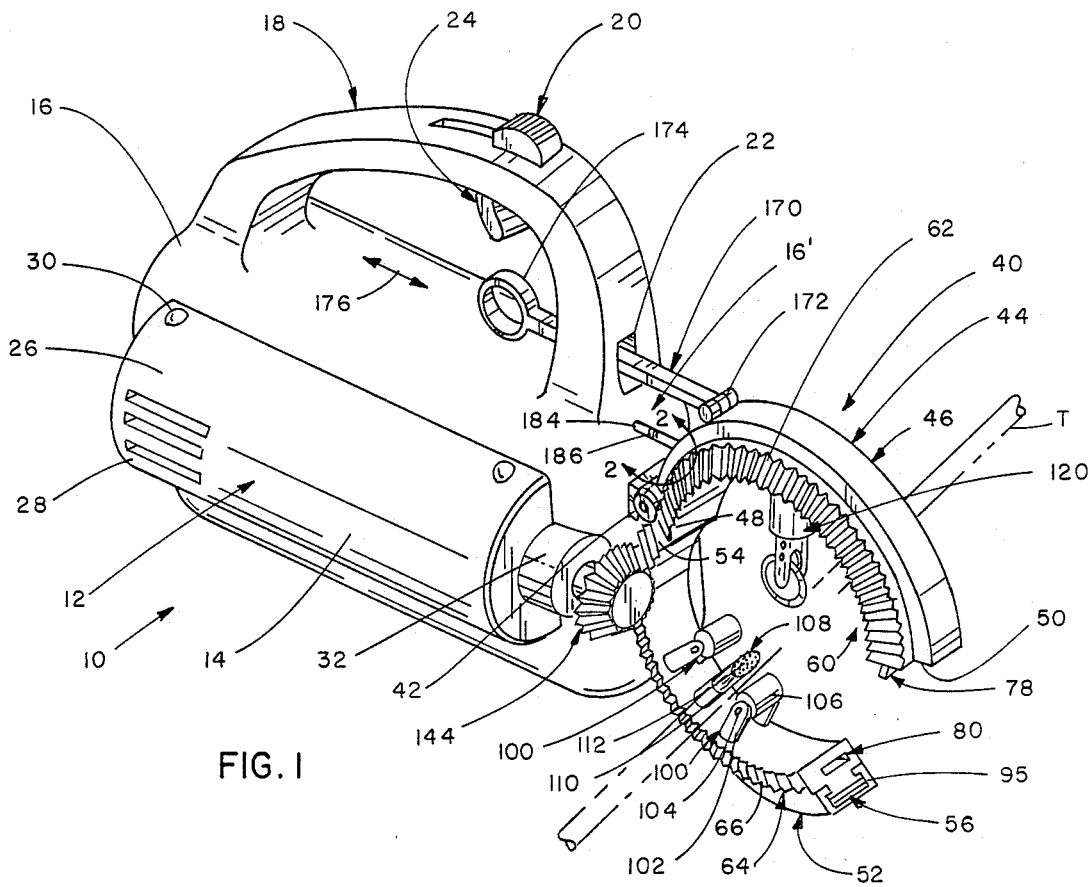
FIG. 1 is a perspective view of a hand-holdable tube cutting device embodying the present invention.
Figure 2:
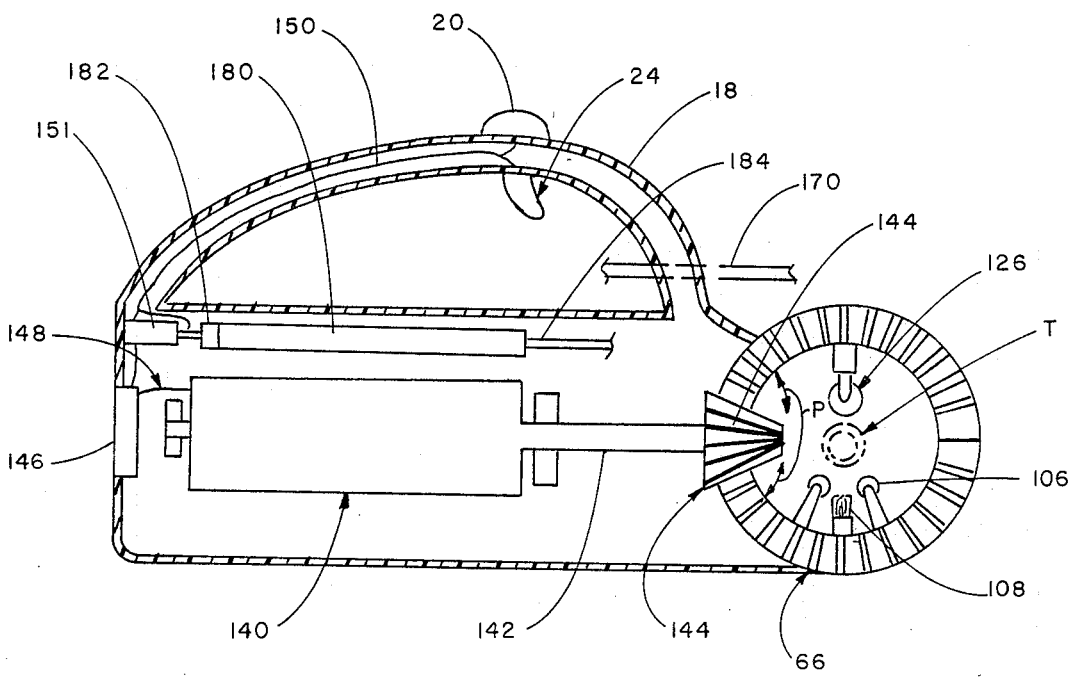
FIG. 2 is a side elevational view of the device in a closed configuration about a tube to be cut.
Figure 3:
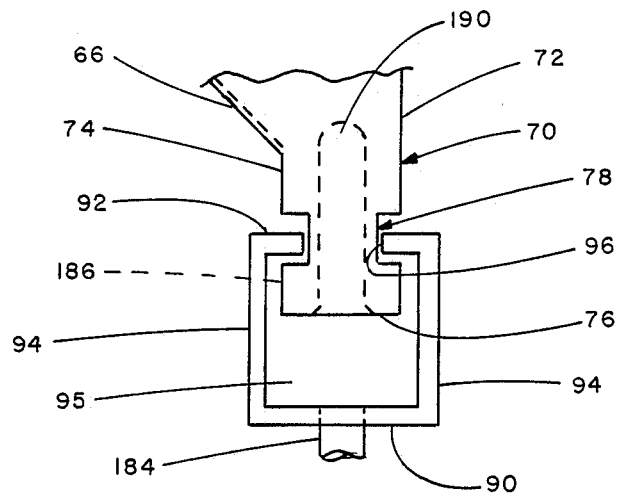
FIG. 3 is a cutaway view along line 3—3 of FIG. 1 showing one portion of the device and illustrating the sliding contact between the driven bevel gear and the housing and the fluid path for applying cutting oil to the cutter blade.
Figure 6:
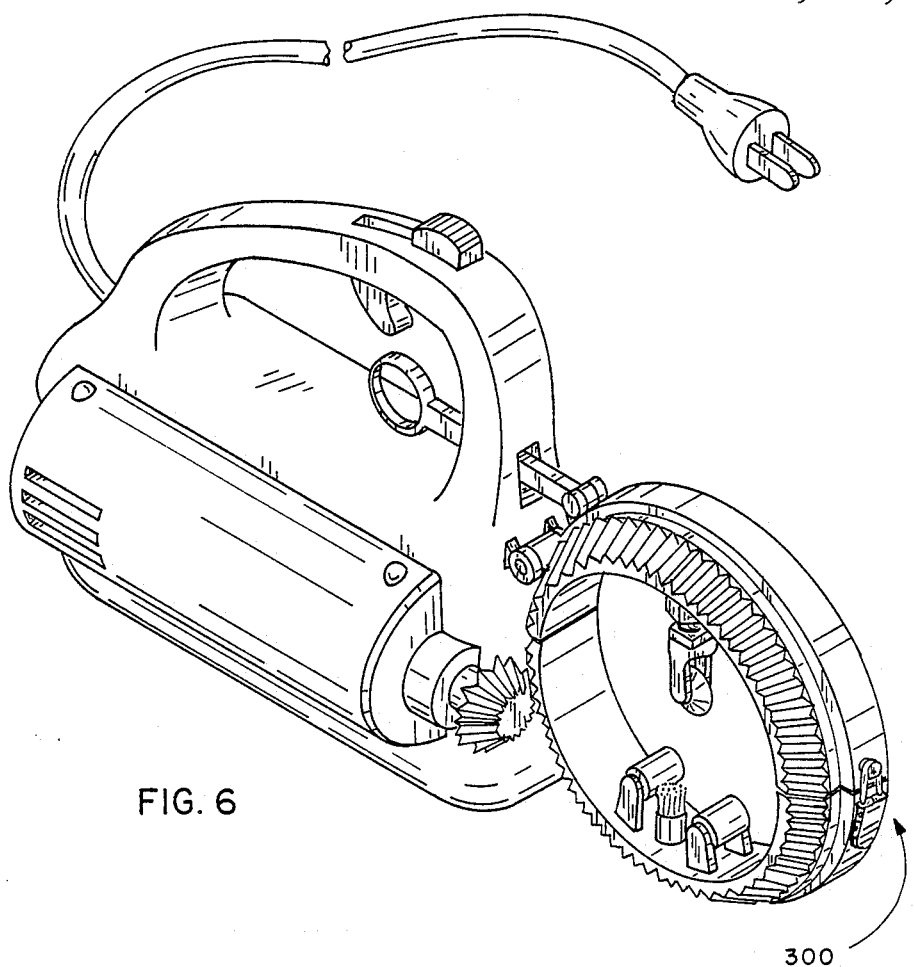
FIG. 6 is a perspective view of another form of the device.

Shown in FIGS. 1, 2 and 3 is a hand-holdable tube cutting device 10 which can be held in one hand and which can perform a plurality of operations associated with the cutting of a tube. It is noted that the FIG. 1 device includes an oiling system that will give the overall device a greater adaptabilty; whereas the FIG. 6 device has no such oiling system. Many uses of the device, such as by electricians or the like, will be in an environment in which an oiling system will not be used, and thus the FIG. 6 form of the device will be more desirable. However, the present disclosure is intended to cover both forms of the device. Both devices have other elements, such as a lock and a vise grip, or the like, that are the same however.

The device 10 includes a case unit 12 having a housing 14 with a top portion 16 and a forward portion 16'. The housing is formed of high-impact plastic material or the like, and a handle clamping unit operating shaft thereon.

In this manner, a single user11 during a cutting operation while controlling that operation. This same single user can also effect and control several operations associated with the tube cutting operation, including sanding the cut tube and applying cutting oil during the cutting operation.

BRIEF DESCRIPTION OF THE DRAWINGS

FIG. 1 is a perspective view of a hand-holdable tube cutting device embodying the present invention.

FIG. 2 is a side elevational view of the device in a closed configuration about a tube to be cut.

FIG. 3 is a cutaway view along line 3—3 of FIG. 1 showing one portion of the device and illustrating the sliding contact between the driven bevel gear and the housing and the fluid path for applying cutting oil to the cutter blade.

Figure 4:
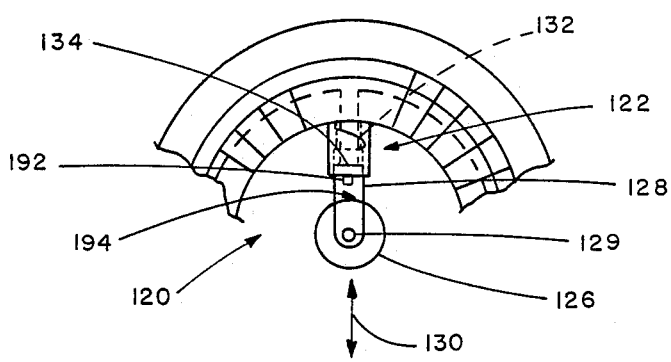
FIG. 4 is a partial view of the connection of the cutter blade to the driven bevel gear.

FIG. 4 is a partial view of the connection of the cutter blade to the driven bevel gear.

Figure 5:
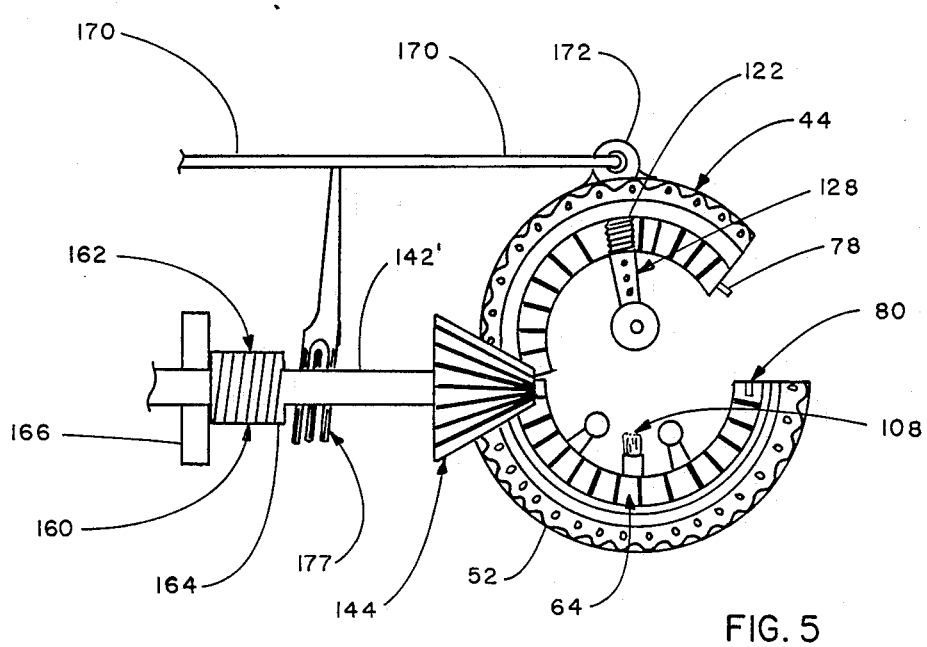
FIG. 5 is a partial side elevational view of a second form of the tube cutting device of the present invention in which the driver shaft is movable.

FIG. 5 is a partial side elevational view of a second form of the tube cutting device of the present invention in which the driver shaft is movable.

DETAILED DESCRIPTION OF THE PREFERRED EMBODIMENT OF THE INVENTION

Shown in FIGS. 1, 2 and 3 is a hand-holdable tube cutting device 10 which can be held in one hand and which can perform a plurality of operations associated with the cutting of a tube.

The device 10 includes a case unit 12 having a housing 14 with a top portion 16 and a forward portion 16'. The housing is formed of high-impact plastic material or the like, and a handle 18 is mounted on the top portion 16 of the housing. An on/off switch 20 is movably and slidably mounted on the handled to be in position to be operated by the user's hand which is holding the handle. A draw-back bar shaft passage 22 is defined in the handle near the forward portion of the housing for a purpose to be described below, and a trigger 24 is movably mounted on the handle beneath the on/off switch to be readily accessible to the user's hand.

The housing 14 includes a motor compartment section 26 that has vents 28 therein and which is attached to the remainder of the housing by fasteners, such as screw 30 to be removable for servicing a motor and other elements contained in the housing. A drive shaft housing 32 is also located on the housing adjacent to to motor compartment.

The device 10 further includes a tube clamping unit 40 on the forward portion of the housing and which is adapted to hold a tube T being cut during a cutting operation while the user is supporting the device 10 via the handle 18. The tube clamping unit 40 includes a hinge mount element 42 having one portion thereof fixed to the housing. The clamping unit includes a bipartite race 44 formed of a top semicircular section 46 connected at one end 48 thereof to the hinge 42 to move between the FIG. 1 open configuration and the FIG. 2 closed configuration clamping the tube T in position. The section 46 further includes another end 50 that is spaced diametrically opposite to the end 48.

The clamping unit bipartite race 44 also includes a bottom semicircular section 52 movably connected at one end 54 thereof to the hinge 42 and having another end 56 thereof located diametrically opposite to that end 54. As can be seen in FIGS. 1 and 2, the two race sections 44 and 52 are essentially equal in size so that a continuous circular element is formed when the two ends 50 and 56 are brought together as shown in FIG. 2.

As can be seen by comparing FIGS. 1 and 2, the race moves along an angular path P indicated by the multi-headed arrows in FIG. 2 during an opening and closing movement. The effect of such movement will be apparent from the ensuing discussion.

As is best shown in FIG. 1, the tube clamping unit further includes a bipartite driven bevel gear 60 slidably mounted in the race 44. The bevel gear 60 includes a top semicircular segment 62 and a bottom semicircular segment 64 that are essentially equal in size to form an essentially continuous circular bevel gear when the clamping unit is closed as shown in FIG. 2. As will be discussed below, the bevel gear is mounted in the race to slide around the tube T during the cutting operation. Each of the bevel gear segments includes a first end located adjacent to the hinge and a second end located diametrically opposite thereto as discussed above with regard to the race.

Each segment of the bevel gear includes a gear tooth section, such as section 66 that is conical in shape and which converges toward the center of the circle defined when the two segments are coupled together. The shape and size of the gear teeth on these sections can be determined by one skilled in the art based on this disclosure, and thus will not be further discussed.

As is best shown in FIG. 3, each segment of the driven bevel gear includes a mounting section 70 that includes a first face 72, a second face 74 and a top face 76 connecting these faces together. Each of the faces includes a channel, such as channel 78, defined therein to form first and second continuous channels when the segments are connected together as in FIG. 2.

Each driven bevel gear segment includes a portion of a lock element, with the lock element including a projection 78 on the top segment and channel 80 in the bottom segment. The projection fits into the channel in a tight fit to lock the two segments together securely enough to effect the cutting operation. When the two gear segments are locked together, the race is closed into the FIG. 2 configuration.

As is best shown in FIG. 3, the race is hollow and rectangular in cross-section to include a top surface 90, a bottom surface 92 and side surfaces 94 connecting the top surface to the bottom surface to define a hollow cavity 95 within the race. An opening 96 is defined in the bottom surface of each race section to co-operate with the opening in the other race section to form an essentially continuous circular channel when the race is closed.

The bevel gear mounting section is received in the hollow cavity with the mounting section channels 78 receiving the edges of the race that are located adjacent to the race channel 96 in a slidable locking manner. The driven bevel gear is thus locked to the housing to slide into and out of the plane of the paper in FIG. 3 to permit the bevel gear to rotate within the plane of the paper in FIG. 2.

The clamping unit further includes two tubes supporting roller units 100 mounted on the bottom segment of the driven bevel gear for rotation therewith. Each roller unit includes two trunnions, such as trunnion 102 that support a pivot pin 104 in a position that is parallel to the inner surface of the gear segement, and a roller, such as roller 106, mounted on the pivot pin to rotate about such pin.

A tube sanding unit 108 is mounted on the bevel gear bottom segment between the roller units 100 to contact the tube T adjacent to the cut made in such tube as the cut is being made. The sanding unit includes a mounting base 110 which supports a tube sanding element 112 at a location to contact the tube as that tube is being supported by the roller units. The sanding element is formed of any material suitable to sanding the particular tube being cut, and can be changed according to the material in the tube.

A tube cutting unit 120 is mounted on the driven bevel gear top segment for movement therewith as is best shown in FIGS. 1 and 4. The cutting unit includes a mounting section 122 having a hollow housing 124 fixed to the gear segment to extend radially inward of that segment. A cutting wheel 126 is mounted on an arm 128 by a pivot pin 129, with the arm being adapted to move into and out of the housing 124 along the radial direction of the bevel gear segment toward and away from the sanding wheel unit as indicated by double-headed arrow 130 in FIG. 4. The cutting wheel is formed of any material suitable to effecting a tube cutting operation. A biasing means, which includes spring 132 biases the cutting wheel toward the center of the driven bevel gear. The spring 132 has one end thereof seated against the race and the other end thereof seated against a spring stop 134 attached to the arm 128.

The driven bevel gear is driven by a drive unit that is best shown in FIGS. 1 and 2. The drive unit includes a motor 140 mounting in the housing 12 and having a drive shaft 142 extending out of that housing adjacent to the forward portion 16 and having a driver bevel gear 144 fixed thereto for rotation therewith. The motor is connected to a power souce, such as batteries in a battery pack 146 by a suitable lead, such as lead 148 and to the on/off switch 20 to be operated thereby. The trigger 24 can control the on/off switch or can act as a speed control for the motor to control the cutting operation. The trigger is shown as being connected to the lead 150 but can be suitably connected to the battery and to the motor as will occur to those skilled in the art to control the operation of that motor. A controller unit 151 is include to permit the trigger and/or the on/off switch to effect the desired control of the motor.

The driver gear 144 is fixed in location, and the driven gear segments move into and out of mesh with the driver gear as the driven gear segments move from the FIG. 1 open configuration into the FIG. 2 closed configuration. The aforediscussed pivotal movement of these segments effects this meshing and de-meshing of the driven and driver gears.

An alternative embodiment of the driver unit is shown in FIG. 5 with the driver bevel gear being movable in the axial direction of a shaft 142'. To permit such movement, the shaft includes a sliding bearing 160. A spring unit 162 is also included to absorb shocks, and includes a spring 164 having one end thereof seated against the bearing housing and the other end seated against a shaft support element 166 that is mounted on the housing 12.

The race, and hence the driven bevel gear, is moved between the FIG. 1 and the FIG. 2 positions by a race moving drawback shaft 170 that is connected at one end thereof to the race top section by a pivot hinge 172, extends through the draw-back shaft passage 22 and has a finger-hold 174 on the other end thereof. The drawback shaft moves in the directions indicated by the double-headed arrow 176 in FIG. 1, and moving the drawback shaft 170 toward the rear of the housing lifts the race from the FIG. 2 closed configuration to the FIG. 1 open configuration whereby the tube T can be moved into or out of the clamping unit without requiring such tube to be "threaded" through the closed unit. Arm 177 connects shaft 170 to shaft 142' in FIG. 5.

The device 10 further includes a cutting oil dispensing system for applying cutting oil to the tube T during the cutting operation. The cutting oil dispensing system is best shown in FIGS. 1, 2, 3 and 4 to include a cutting oil reservoir 180 mounted in the housing and having a pump 182 associated therewith for moving cutting oil out of the reservoir through a tube 184. The pump is connected to the power source via the controller 151, and thus can be controlled by the trigger 24 or the on/off switch if suitable. The tube 184 includes a flexible portion 186 which permits the tube to accommodate the aforediscussed opening movement of the race.

As best shown in FIGS. 1 and 3, the fluid line 184 is fluidically connected to the race hollow cavity 95 to dispense cutting oil thereinto. The driven bevel gear mounting section has an oil passage 186 defined therein to be in fluid communication with the cavity 95 to receive oil from that cavity. The passage 186 extends radially inward of the gear and is in fluid communication with a circular passage 190 that extends completely around the driven bevel gear to conduct the cutting oil around the driven bevel gear.

As is shown in FIG. 4, the housing of unit 122 is hollow, and passage 190 is in fluid communication with the interior of that housing to conduct oil thereinto. A cutting oil dispensing nozzle 192 is mounted on the housing adjacent to the cutting wheel 126. The nozzle 192 directs cutting oil 194 onto the tube T during the cutting operation adjacent to the cutting wheel. Operation of the trigger will control the pump 182 to thus control the amount of cutting oil dispensed onto the tube.

Operation of the device 10 is evident from the foregoing, and includes using the draw-back shaft to open the clamping unit to receive the tube T to be cut, operating the drawback-shaft to close the clamping unit onto the tube with the sanding unit and the roller units in contact with that tube at locations thereon that are opposed to the cutting unit. The spring in the cutting unit biases the cutting wheel against the tube. The unit is turned on by operating the on/off switch, and this applies power to the motor 140 and to the pump 180 to begin rotating the driver bevel gear that is meshed with the driven bevel gear on the closing of the race, and to begin moving cutting oil into the cutting oil dispensing system. The race and the driven bevel gear rotate, and cutting oil is dispensed against the tube adjacent to the cutting blade 126. The speed of rotation, and hence the speed of the tube cutting operation, is controlled, along with the amount of cutting oil dispensed, is controlled using the trigger 24 via the control unit 151. During the cutting operation, the tube is sanded by contact with the sanding unit since the cutting wheel is biased toward that sanding unit, and cutting oil is continually applied to the tube.

The form of the device shown in FIG. 6–12 is similar to that discussed above, and thus will not be discussed in detail. However, it is noted that the FIG. 6 device does not include an oiling system. The device 10' includes a lock element 300 which is identical to the lock element included, but not shown in the figures, on the above-discussed form of the device. A vise grip assembly 302 is located on the side of the device to grip the workpiece, and a reeming device 304 is located on the rear of the device. The reeming device is connected to the motor via a movable gear connection 306 to be driven by that motor when the gear connection is engaged. The device 304 is movable left and right in FIG. 7. Those skilled in the art of gear connections will understand what sort of gear connections must be used to achieve the just-described function, and thus such gear system will not be specifically described, and incorporation by reference will be made of textbooks such as "Ingenious Mechanisms" (three volumes) by Horton and Jones, and "Pictoral Handbook to Technical Devices" by Schwatz and Grafstein.

Figure 7:
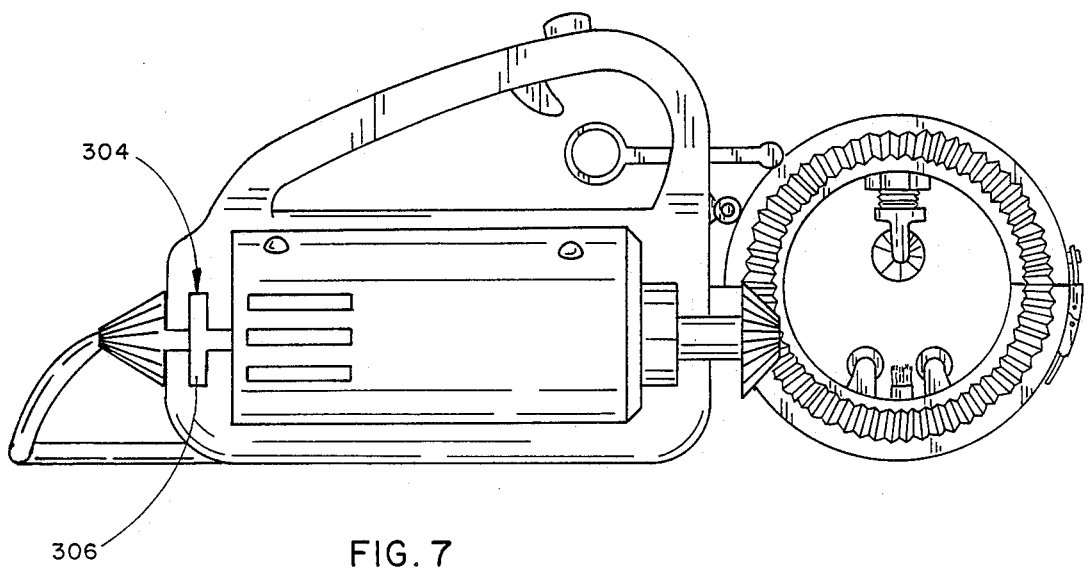
FIG. 7 is a side elevational view of the FIG. 6 device.
Figure 11:
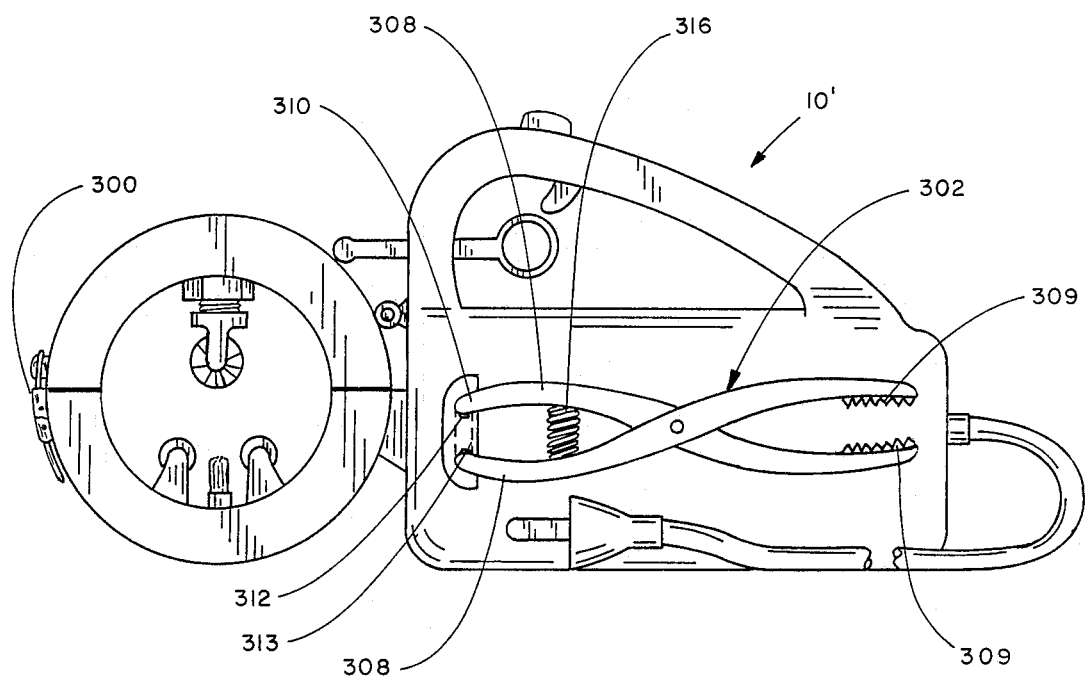
FIG. 11 is a side elevational view of the FIG. 6 device.
Figures 8, 12:
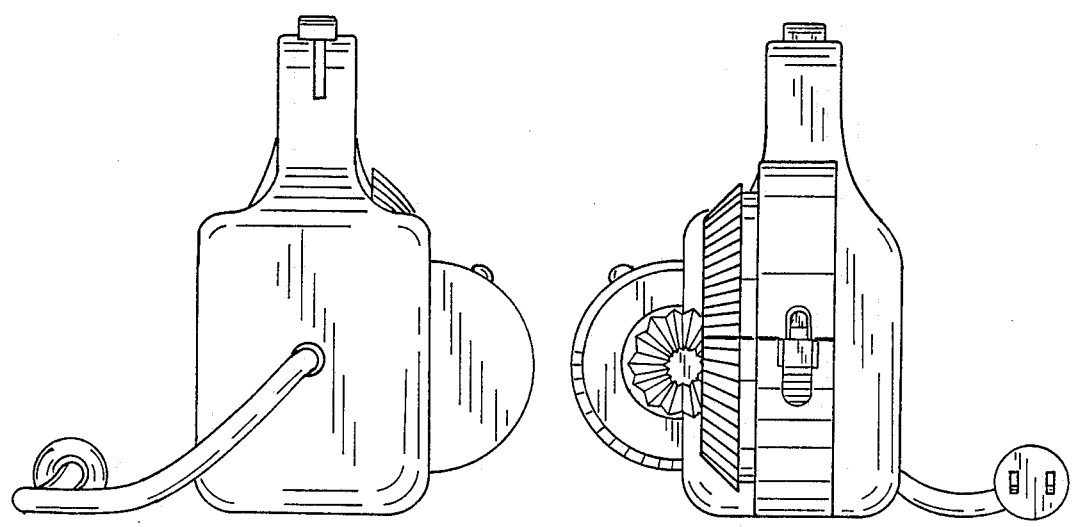
FIG. 8 is a rear end elevational view of the FIG. 6 device.
FIG. 12 is a rear end elevational view of the FIG. 6 device.
Figure 9:
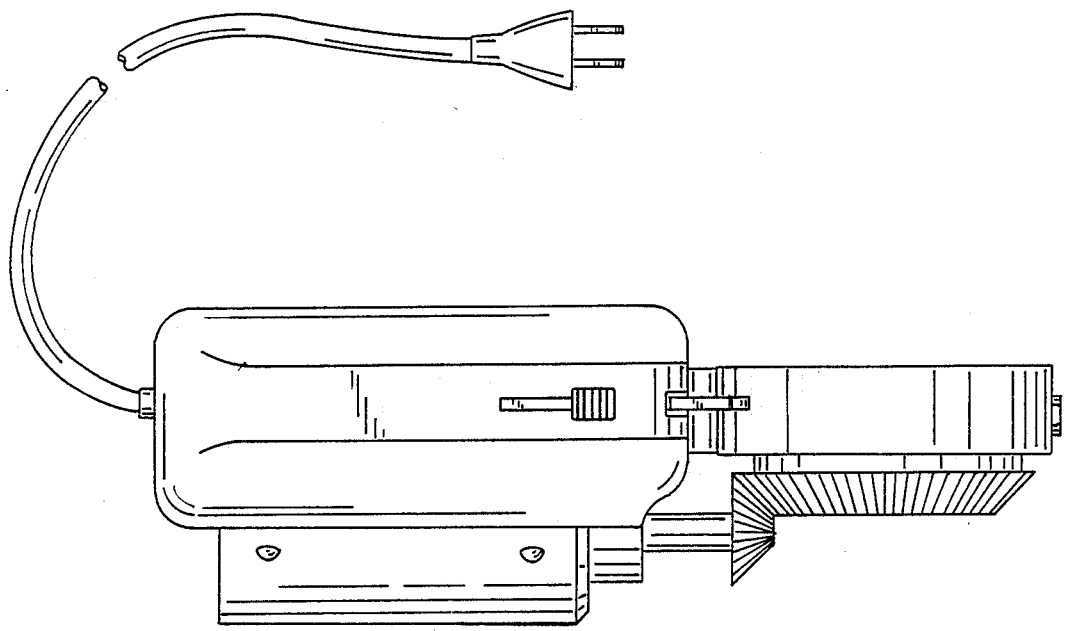
FIG. 9 is a top plan view of the FIG. 6 device.
Figure 10:
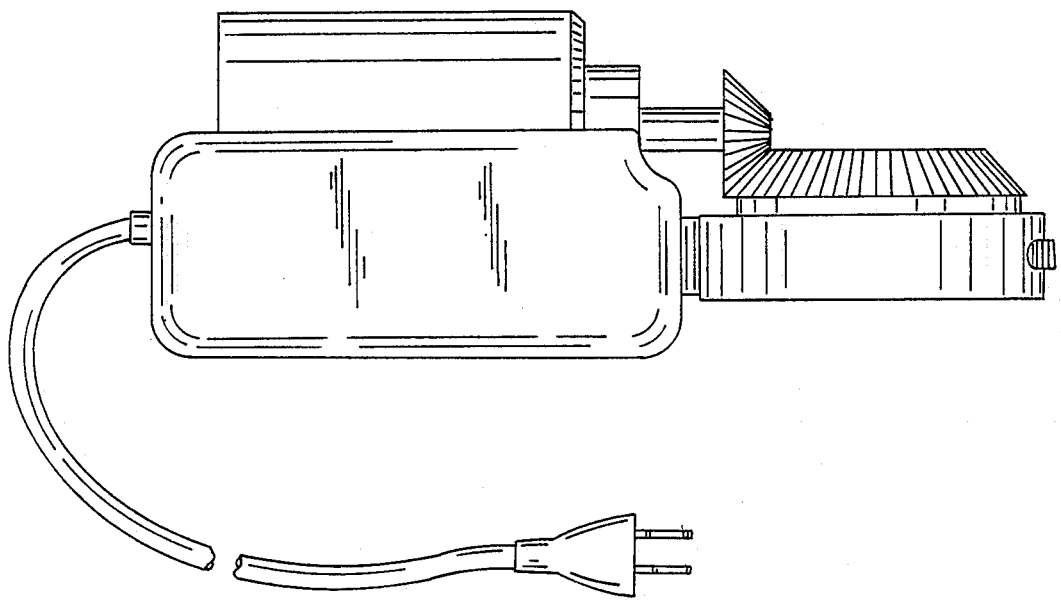
FIG. 10 is a bottom view of the FIG. 6 device.

For the sake of clarity, the vise grip assembly and the reemer assembly are shown only in FIGS. 7 and 11, but it is to be understood that some portion of these devices will be seen in all views.

The vise grip includes two spring loaded hendle elements 308 which have workpiece engaging ends 309 thereon and are movably connected to the device to clamp and release the workpiece and to swing toward and away from the body of the device so as to securely grip a workpiece. Thus, the vise grip assembly includes a hinge or pivot element 310 attaching each handle to a projection 312 that is vertically movable in a slot 313 on the device body. In this manner, the vise grip assembly can be moved from the position shown in FIG. 11 to a position adjacent to the cutting assembly by swinging such vise grip assembly out of the plane of the paper. A spring 316 is included in the assembly.

It is understood that while certain forms of the present invention have been illustrated and described herin, it is not to be limited to the specific forms or arrangements of parts described and shown.

I claim:

1. A hand-holdable tube cutting device comprising:
 (A) a case unit which includes
  (1) a housing having a top portion and a forward portion, and
  (2) a handle mounted on said housing top portion, said handle including an on/off switch movably mounted thereon and a draw-back shaft passage defined therethrough adjacent to said housing forward portion;
 (B) a tube clamping unit which includes
  (1) a hinge amount fixed to said housing forward portion,
  (2) a bipartite race connected to said hinge mount and including a top semicircular section movably connected at one end thereof to said hinge mount and having another end diametrically opposite to said one end, a bottom semicircular section movably connected at one end thereof to said hinge mount and having another end diametrically opposite to said bottom section one end, said race top and bottom sections being essentially equal in size to form a circular race when said another ends are in contact,
  (3) each of said race sections being hollow and rectangular in cross section and having a top surface, a bottom surface and side surfaces connecting said top and bottom surfaces together with an opening being defined through said bottom surface of each race section, said race section openings cooperating to define a continuous circular channel when said race sections are locked together at said another ends,
  (4) a bipartite driven bevel gear slidably mounted on said race and including a semicircular top segment, a semicircular bottom segment, with each segment including a mounting section having a first face, a second face and a top connecting said first face to said second face of each mounting segment, said driven bevel gear segments being essentially equal in size to form a circular element, with said top segment having a projection on one end thereof and said bottom segment having a mating lock element on one end thereof for co-operation with said projection to lock said top segment to said bottom segment to form a circular bevel gear when said top segment is locked to said bottom segment, with said section channels being located to define first and second essentially continuous circular channels in said mounting sections, said circular channels being located and sized to slidably engage said race side surfaces adjacent to said race channels to slidably mount said driven bevel gear on said race to rotate with respect to said race,
  (5) two supporting roller units mounted on said driven bevel gear bottom segment,
  (6) a tube sanding roller unit mounted on said driven bevel gear bottom segment between said roller units,
  (7) a tube cutter unit mounted on said driven bevel gear top segment for movement therewith and including a cutting wheel mounting section, a biasing means, a cutting wheel mounted to be biased by said biasing means toward said sanding roller unit;
 (C) a bevel gear driver unit which includes
  (1) a motor mounted in said case unit housing and including a drive shaft and means connecting said motor to a power source and to said on/off switch,
  (2) a driver bevel gear mounted on said motor drive shaft for rotation therewith and in a position to drivingly engage said driven bevel gear when said driven bevel gear top segment is locked to said driven gear bottom segment; and
 (D) a race moving draw-back shaft connected at one end thereof to said race top section and extending through said case unit draw-back shaft passage for movement toward and away from said case unit housing forward end to move said race sections together and apart.

2. The tube cutting device defined in claim 1 further including a cutting oil dispensing system.

3. The tube cutting device defined in claim 2 wherein said cutting oil dispensing system includes an oil channel defined through said driven bevel gear mounting sections and being in fluid communication with the interior of said race hollow sections, a cutting oil reservior located in said case unit housing, and a fluid line fluidically connecting said race hollow sections to said cutting oil reservoir.

4. The tube cutting device defined in claim 3 wherein said fluid line includes a flexible collapsible section.

5. The tube cutting device defined in claim 4 wherein said cutting oil dispensing system includes an oil dispensing nozzle mounted on said tube cutting unit adjacent to said cutting blade and directing cutting oil onto a tube being cut by said cutting blade at a location of contact between said cutting blade and the tube.

6. The tube cutting device defined in claim 5 further including a trigger attached to said handle and to said on/off switch.

7. The tube cutting device defined in claim 6 further including a finger-grip element on said draw-back shaft.

8. The tube cutting device defined in claim 7 wherein said biasing means includes a spring.

9. The tube cutting device defined in claim 8 further including a cutting oil pump connected to said cutting oil reservoir and to the power source.

* * * * *